US008240578B2

(12) United States Patent
Adams et al.

(10) Patent No.: US 8,240,578 B2
(45) Date of Patent: *Aug. 14, 2012

(54) METHOD, SYSTEM AND SMART CARD READER FOR MANAGEMENT OF ACCESS TO A SMART CARD (75) Inventors: Neil Patrick Adams, Waterloo (CA); Michael E. McCallum, Elmira (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,642

(22) Filed: Dec. 12, 2011

(65) Prior Publication Data

US 2012/0080524 A1    Apr. 5, 2012

Related U.S. Application Data (63) Continuation of application No. 13/007,868, filed on Jan. 17, 2011, now Pat. No. 8,079,530, which is a continuation of application No. 11/622,250, filed on Jan. 11, 2007, now Pat. No. 7,871,010.

(60) Provisional application No. 60/807,743, filed on Jul. 19, 2006.

(51) Int. Cl.
*G06K 19/06* (2006.01)

(52) U.S. Cl. .................. 235/492; 235/380; 235/441

(58) Field of Classification Search .................. 711/115
See application file for complete search history.

(56) References Cited

U.S. PATENT DOCUMENTS

| 5,227,613 | A | 7/1993 | Takagi et al. |
| 6,199,128 | B1 | 3/2001 | Sarat |
| 6,256,690 | B1 | 7/2001 | Carper |
| 6,317,829 | B1 | 11/2001 | Van Oorschot |
| 6,676,022 | B1 * | 1/2004 | Guthery et al. ............ 235/492 |

(Continued)

FOREIGN PATENT DOCUMENTS

EP    1049306    11/2000

(Continued)

OTHER PUBLICATIONS

United States Examiner Interview Summary, U.S. Appl. No. 11/687,331 dated Apr. 1, 2009.

(Continued)

*Primary Examiner* — Thien M. Le
*Assistant Examiner* — Sonji Johnson
(74) *Attorney, Agent, or Firm* — Bereskin and Parr LLP/S.E.N.C.R.L., s.r.l.

(57) ABSTRACT

The described embodiments relate generally to devices, methods and systems for managing access to a memory card, such as a smart card, by a plurality of accessing devices. Certain embodiments relate to a smart card reader for managing concurrent access to a smart card, wherein when a channel manager receives a close session request from a first accessing device, and a first session is open on a first channel for the first accessing device and a second session is open on a second channel for a second accessing device, the channel manager is configured to: issue a close channel command to the smart card to close the second channel; issue the close session request from the first accessing device to the smart card; and issue a further session request to the smart card to re-open the first channel, and continue the second session on the re-opened first channel.

20 Claims, 6 Drawing Sheets

U.S. PATENT DOCUMENTS

| | | | |
|---|---|---|---|
| 6,776,339 B2 | 8/2004 | Piikivi | |
| 6,824,064 B2 | 11/2004 | Guthery et al. | |
| 6,980,660 B1 | 12/2005 | Hind et al. | |
| 6,997,381 B2 | 2/2006 | Arnouse | |
| 7,013,365 B2 | 3/2006 | Arnouse | |
| 7,043,754 B2 | 5/2006 | Arnouse | |
| 7,139,914 B2 | 11/2006 | Arnouse | |
| 7,299,983 B2 | 11/2007 | Piikivi | |
| 7,418,717 B1 | 8/2008 | Dolske et al. | |
| 7,464,865 B2 | 12/2008 | Brown et al. | |
| 7,766,243 B2 | 8/2010 | Adams et al. | |
| 7,871,010 B2 | 1/2011 | Adams et al. | |
| 7,891,557 B2 | 2/2011 | Brown et al. | |
| 8,047,444 B2 | 11/2011 | Adams et al. | |
| 2002/0197956 A1 | 12/2002 | Annola et al. | |
| 2003/0136829 A1 | 7/2003 | Hosogoe et al. | |
| 2004/0255127 A1 | 12/2004 | Arnouse | |
| 2005/0045720 A1 | 3/2005 | Fruhauf | |
| 2005/0086479 A1 | 4/2005 | Ondet et al. | |
| 2005/0120096 A1 | 6/2005 | Rekimoto et al. | |
| 2005/0132151 A1 | 6/2005 | Kuriyama | |
| 2005/0139669 A1 | 6/2005 | Arnouse | |
| 2005/0168323 A1 | 8/2005 | Lenoir et al. | |
| 2005/0177735 A1 | 8/2005 | Arnouse | |
| 2006/0049243 A1 | 3/2006 | Sakamura et al. | |
| 2006/0049258 A1* | 3/2006 | Piikivi | 235/451 |
| 2006/0129639 A1 | 6/2006 | Purdy et al. | |
| 2007/0055877 A1 | 3/2007 | Persson et al. | |
| 2007/0251997 A1 | 11/2007 | Brown et al. | |
| 2009/0020602 A1* | 1/2009 | Pratone | 235/380 |
| 2009/0095812 A1 | 4/2009 | Brown et al. | |

FOREIGN PATENT DOCUMENTS

| | | |
|---|---|---|
| EP | 1544809 | 6/2005 |
| EP | 1605627 | 12/2005 |
| EP | 1635508 | 3/2006 |
| EP | 2041691 | 1/2011 |
| WO | 99/54804 | 10/1999 |
| WO | 01/16759 | 3/2001 |
| WO | 0233866 | 4/2002 |
| WO | 02063576 | 8/2002 |
| WO | 2004029860 | 4/2004 |

OTHER PUBLICATIONS

United States Response to Amendment After Allowance, U.S. Appl. No. 11/687,331 dated May 25, 2010.
United States Office Action Response, U.S. Appl. No. 11/687,331 dated May 12, 2009.
United States Notice of Allowance, U.S. Appl. No. 11/687,331 dated Jul. 23, 2009.
United States RCE, U.S. Appl. No. 11/687,331 dated Sep. 3, 2009.
United States Notice of Allowance, U.S. Appl. No. 11/687,331 dated Oct. 19, 2009.
United States RCE, U.S. Appl. No. 11/687,331 dated Dec. 22, 2009.
United States Certificate of Correction, U.S. Appl. No. 11/412,759 dated Feb. 17, 2009.
United States Request for Certificate of Correction, U.S. Appl. No. 11/412,759 dated Jan. 12, 2009.
United States Notice of Allowance, U.S. Appl. No. 11/412,759 dated Aug. 11, 2008.
United States Amendment, U.S. Appl. No. 11/412,759 dated Jul. 7, 2008.
United States Office Action, U.S. Appl. No. 11/412,759 dated Feb. 5, 2008.
European Notice of Intent to Grant, European Patent Application No. 07701666.5, dated Oct. 29, 2010.
United States Notice of Allowance, U.S. Appl. No. 12/335,212, dated Oct. 18, 2010.
Chinese Office Action, Chinese Patent Application No. 200780034636.6, dated Sep. 30, 2010.
International Preliminary Search Report on Patentability dated Jan. 29, 2009, International Patent Application No. PCT/CA2007/000437.
Research in Motion Limited, "Blackberry Smart Card Reader Security", Release 1.0, White Paper, 2005, p. 1-16.
Maier, "Authentication and Paring in Limited Mobile Environments", INET, [Online] Mar. 17, 2004, XP002396358, URL: "http://www.esat.kuleuven.ac.be/cosic/seminars/slides/seminar-2004-03-17.pdf", [retrieved on Aug. 24, 2006], p. 2-11.
European Search Report dated Oct. 26, 2009, European Patent Application No. 07701666.5.
European Search Report dated Oct. 26, 2009, European Patent Application No. 07710765.4.
JSR 177 Expert Group, "Security and Trust Services API (SATSA) for Java™ 2 Platform, Micro Edition", Version 1.0, Java Community Press, pp. 86-95, Jul. 28, 2004.
International Standard ISO/IEC 7816-4:1995 (first edition).
International Standard ISO/IEC 7816-4:2005 (available for purchase at http://www.iso. org/iso/en/CatalogueDetailPage.CatalogueDetail?CSNUMBER=36134&ICS1=35&ICS2=240&ICS3=15).
European Search Report dated Nov. 11, 2009, European Patent Application No. 07701666.5.
United States Office Action dated Oct. 19, 2009, U.S. Appl. No. 12/335,212.
United States Office Action Response dated Jan. 19, 2010, U.S. Appl. No. 12/335,212.
United States Office Action dated Mar. 29, 2010, U.S. Appl. No. 12/335,212.
United States Office Action Response dated Sep. 29, 2010, U.S. Appl. No. 12/335,212.
United States Office Action dated Sep. 30, 2010, U.S. Appl. No. 12/846,931.
United States Office Action Response dated Oct. 26, 2010, U.S. Appl. No. 12/846,931.
Canadian Office Action, Canadian Patent Application No. 2,658,422 dated Jul. 11, 2011.
European Office Action, European Patent Application No. 11161043.2 dated May 26, 2011.
United States Notice of Allowance, U.S. Appl. No. 12/846,931 dated Jun. 17, 2011.
Chinese Notification of Grant, Chinese Patent Application No. 200780034636 dated May 26, 2011.
Canadian Office Action, Canadian Patent Application No. 2,568,419 dated Jul. 8, 2011.
United States Notice of Allowance, U.S. Appl. No. 12/846,931 dated Feb. 18, 2011.
European Notice of Intent to Grant, European Patent Application No. 07710765.4 dated Jun. 14, 2010.
International Search Report and Written Opinion dated Jun. 19, 2007, International Patent Application No. PCT/CA2007/000437.
European Decision to Grant dated Dec. 9, 2010, European Patent Application No. 07710765.4.
European Communication under Rule 71(3) EPC dated Jun. 14, 2010, European Patent Application No. 07710765.4.
European Decision to Grant dated Apr. 21, 2011, European Patent Application No. 07701666.5.
European Communication under Rule 71(3) EPC dated Oct. 29, 2010, European Patent Application No. 07701666.5.
International Preliminary Report on Patentability and Written Opinion dated Jan. 29, 2009, International Patent Application No. PCT/CA2007/000437.
International Search Report and Written Opinion dated Apr. 20, 2007, International Patent Application No. PCT/CA2007/000035.
Co-pending U.S. Appl. No. 13/007,868, "Method, System and Smart Card Reader for Management of Access to a Smart Card", filed Jan. 17, 2011.
United States Office Action, U.S. Appl. No. 13/007,868 dated Mar. 2, 2011.
United States Office Action Response and Terminal Disclaimer, U.S. Appl. No. 13/007,868 dated Jul. 4, 2011.
United States Notice of Allowance, U.S. Appl. No. 13/007,868 dated Aug. 18, 2011.
United States Amendment After Allowance, U.S. Appl. No. 11/687,331 dated May 6, 2010.

United States Office Action, U.S. Appl. No. 11/622,250 dated Nov. 13, 2008.
United States Office Action Response, U.S. Appl. No. 11/622,250 dated Feb. 13, 2009.
United States Office Action, U.S. Appl. No. 11/622,250 dated May 27, 2009.
United States Office Action Response, U.S. Appl. No. 11/622,250 dated Aug. 27, 2009.
United States Final Office Action, U.S. Appl. No. 11/622,250 dated Dec. 11, 2009.
United States Office Action Response and RCE, U.S. Appl. No. 11/622,250 dated May 11, 2010.
United States Notice of Allowance and Examiner Interview Summary, U.S. Appl. No. 11/622,250 dated Sep. 3, 2010.
United States Notice of Allowance, U.S. Appl. No. 11/687,331 dated Mar. 5, 2010.
United States Office Action, U.S. Appl. No. 11/687,331 dated Nov. 13, 2008.

* cited by examiner

METHOD, SYSTEM AND SMART CARD READER FOR MANAGEMENT OF ACCESS TO A SMART CARD

CROSS-REFERENCE TO RELATED APPLICATIONS

This application is a continuation of U.S. patent application Ser. No. 13/007,868, filed Jan. 17, 2011, which is a continuation of U.S. patent application Ser. No. 11/622,250, filed Jan. 11, 2007, now issued as U.S. Pat. No. 7,871,010, which claims the benefit of U.S. Provisional Patent Application No. 60/807,743, filed Jul. 19, 2006. The entirety of U.S. patent application Ser. No. 13/007,868, U.S. patent application Ser. No. 11/622,250 and U.S. Provisional Patent Application No. 60/807,743 are hereby incorporated by reference.

TECHNICAL FIELD

Embodiments relate to methods and systems for management of access to a smart card. In particular, embodiments relate to facilitating access to the smart card by multiple devices concurrently.

BACKGROUND

Communication with a smart card requires a session to be opened between the smart card and the application that wishes to communicate with it. The secure nature of a smart card requires that only one session can be open at any given time. Most smart card readers (SCR) are connected to one system at a time, which allows for its exclusive use by the attached system. Many systems take advantage of this exclusivity by maintaining an open session with the smart card for the duration of the time the smart card is inserted in the reader.

With some SCRs, it is possible (even likely) that more than one connection will exist at a given time. However, if a session is opened by one of the connected systems, it is generally not possible for another connected system to open the session for its own use until the system which currently has the open session decides to close its session.

This may be the case when both a handheld device and a PC are connected to the SCR. When the PC is notified by the SCR that a smart card has been inserted, the PC will typically open the smart card session and keep the session open until the connection with the reader is terminated or the smart card is removed from the SCR. Since the smart card session is always being held open by the PC, the handheld device cannot initiate a session with the smart card. This prevents the handheld device user from performing operations such as signing or decrypting emails, and if the smart card is required for authenticating the user for use of the handheld device, the user will not be able to unlock the handheld device.

BRIEF DESCRIPTION OF THE DRAWINGS

Embodiments are described in further detail below, by way of example only, with reference to the accompanying drawings, in which.

DETAILED DESCRIPTION

The described embodiments relate generally to devices, methods and systems for managing access to a memory card, such as a smart card, by a plurality of accessing devices. Further embodiments relate to computer readable storage storing computer program instructions for execution by a processor to perform the described methods.

Certain embodiments relate to a smart card reader (SCR) for managing concurrent access to a smart card by a plurality of accessing devices, the SCR comprising: a processor; a channel manager responsive to the processor for interfacing with the smart card; a communication interface responsive to the channel manager for communicating with the plurality of accessing devices; and wherein, when a session is open on a first channel between a first accessing device and the smart card and the channel manager is configured to issue an open channel command to the smart card to cause the smart card to open a second channel between the smart card and the second accessing device in response to the session request.

The open channel command may be a MANAGE_CHANNEL command. The smart card reader may further comprise a memory storing a connection table, wherein the connection table includes entries for each session established between the smart card and a respective accessing device. The connection table may include for each session entry, one or more channel entries.

When the first and second channels are open between the smart card and respective first and second accessing devices and the channel manager receives a further session request from one of the first accessing device, the second accessing device and a third accessing device, the channel manager may be configured to issue a further open channel command to the smart card to cause the smart card to open a third channel between the smart card and the one accessing device in response to the further session request.

The channel manager may be configured to receive data units from the second accessing device intended for transmission to the smart card on the first channel and to modify data units to indicate that the data units were received over the second channel. The channel manager may modify a class byte of the data units to indicate that the data units were received over the second channel.

The channel manager may control the channels that can be opened between the smart card and the plurality of accessing devices so that the total number of channels is limited to a predetermined number. The smart card reader may further comprise a socket for receiving the smart card and electrically coupling the processor and the smart card. The communication interface may comprise a wireless communication interface.

Other embodiments relate to a method for managing concurrent access to a smart card by a plurality of accessing devices. The method comprises: while a session is open on a first channel between a first accessing device and the smart card, receiving at a smart card reader a session request from a second accessing device; issuing an open channel command to the smart card to cause the smart card to open a second channel between the smart card and the second accessing device in response to the session request.

The open channel command may be a MANAGE_CHANNEL command. The method may further comprise storing a connection table in a memory of the smart card reader, the connection table comprising entries for each session established between the smart card and a respective accessing device. The connection table may include, for each session entry, one or more channel entries.

When first and second channels are open between the smart card and respective first and second accessing devices, the method may further comprise: receiving a further session request from one of the first accessing device, the second accessing device and a third accessing device; and issuing a further open channel command to the smart card to cause the smart card to open a third channel between the smart card and the one accessing device in response to the further session request.

The method may further comprise controlling the channels that can be opened between the smart card and the plurality of accessing devices so that the total number of channels is limited to a predetermined number. The method may further comprise: receiving data units from the second accessing device intended for transmission to the smart card on the first channel; and modifying the data units to indicate that the data units were received over the second channel. The modifying may comprise modifying a class byte of the data units to indicate that the data units were received over the second channel. The session request may be received by wireless communication between the smart card reader and the second accessing device.

Other embodiments relate to computer readable storage storing program instructions which, when executed by a processor on a smart card reader, cause the processor to perform a method of managing concurrent access to a smart card by a plurality of accessing devices, the method comprising: while a session is open on a first channel between a first accessing device and the smart card, receiving at a smart card reader a session request from a second accessing device; issuing an open channel command to the smart card to cause the smart card to open a second channel between the smart card and the second accessing device in response to the session request.

Other embodiments relate to a card reader device for managing access to a memory card by a plurality of accessing devices. The card reader device comprises a processor, a wireless communication interface and a memory card interface. The wireless communication interface is responsive to the processor for communicating with the plurality of accessing devices. The memory card interface enables communication between the processor and the memory card. When a first secure session is open between a first accessing device and the memory card and the card reader device receives an open session command from a second accessing device, the processor is configured to terminate the first secure session and to allow the second accessing device to open a second secure session between the memory card and the second accessing device in response to the open session command.

The processor may be configured to terminate the first open session by notifying the first accessing device that the memory card cannot be accessed by the card reader device. The notification may be that the memory card has been removed from the card reader device.

The first accessing device may be a personal computer. The second accessing device may be a mobile device, such as a wirelessly enabled handheld device. The card reader device may further comprise a serial interface for wired communication with one of the plurality of accessing devices.

The card reader device may be further configured to end the second secure session in response to an end session command from the second accessing device and to notify the first accessing device that the memory card is available to open another secure session. The notification of availability may be that the memory card is received in the card reader device. The memory card may be a smart card.

Further embodiments relate to a method of managing communication between a memory card and first and second accessing devices when a first secure session is established between the memory card and the first accessing device by a card reader. The method comprises the steps of: receiving an open session command at the card reader from the second accessing device; terminating the first secure session between the first accessing device and the memory card in response to the open session command; and opening a second secure session between the second accessing device and the memory card.

The method may further include the steps of: receiving a close session command at the card reader from the second accessing device and closing the second secure session in response to the close session command; and notifying the first accessing device that the memory card is available to establish another secure session.

The first session may be terminated by notifying the first accessing device that the memory card cannot be accessed by the card reader device. The notification may be that the memory card has been removed from the card reader device.

The first accessing device may be a personal computer. The second accessing device may be a mobile device. The memory card may be a smart card.

Other embodiments relate to a system for managing access to a memory card by a plurality of accessing devices. The system comprises a card reader device, a first accessing device and a second accessing device. The card reader device has a processor, a wireless communication interface responsive to the processor for communicating with the plurality of accessing devices (including the first and second accessing devices) and a memory card interface for enabling communication between the processor and the memory card. The first and second accessing devices are in communication with the card reader device. When a first secure session is open between the first accessing device and the memory card and the card reader device receives an open session command from the second accessing device, the processor is configured to terminate the first secure session and to allow the second accessing device to open a second secure session between the memory card and the second accessing device in response to the open session command.

Another embodiment relates to computer readable storage storing computer program code, which, when executed by a processor of a card reader device, cause the card reader device to terminate a first secure session between a first accessing device and a memory card accessible to the card reader device in response to receipt of an open session command from a second accessing device and allow a second secure session to be opened between the second accessing device and the memory card.

Communication with a smart card during a smart card session is processed on what is referred to as the basic channel. ISO 7816-4, Section 6.16 defines the MANAGE_CHANNEL command, which can be used to create up to three logical channels (in addition to the basic channel) on which to communicate with the smart card. Opening a new logical channel allows the commands to be processed by the smart card without affecting the session state of the basic channel or other logical channels.

In the current architecture on the Microsoft Windows™ platform, for example, the manufacturer of the smart card typically supplies a Cryptographic Service Provider (CSP) which is used by the operating system and applications on the PC to communicate with the smart card. It is the CSP that maintains the long term smart card session. The CSP manages communication with the smart card through the SCR, ensuring that responses are provided to the process that sent the associated command.

Figure 1:
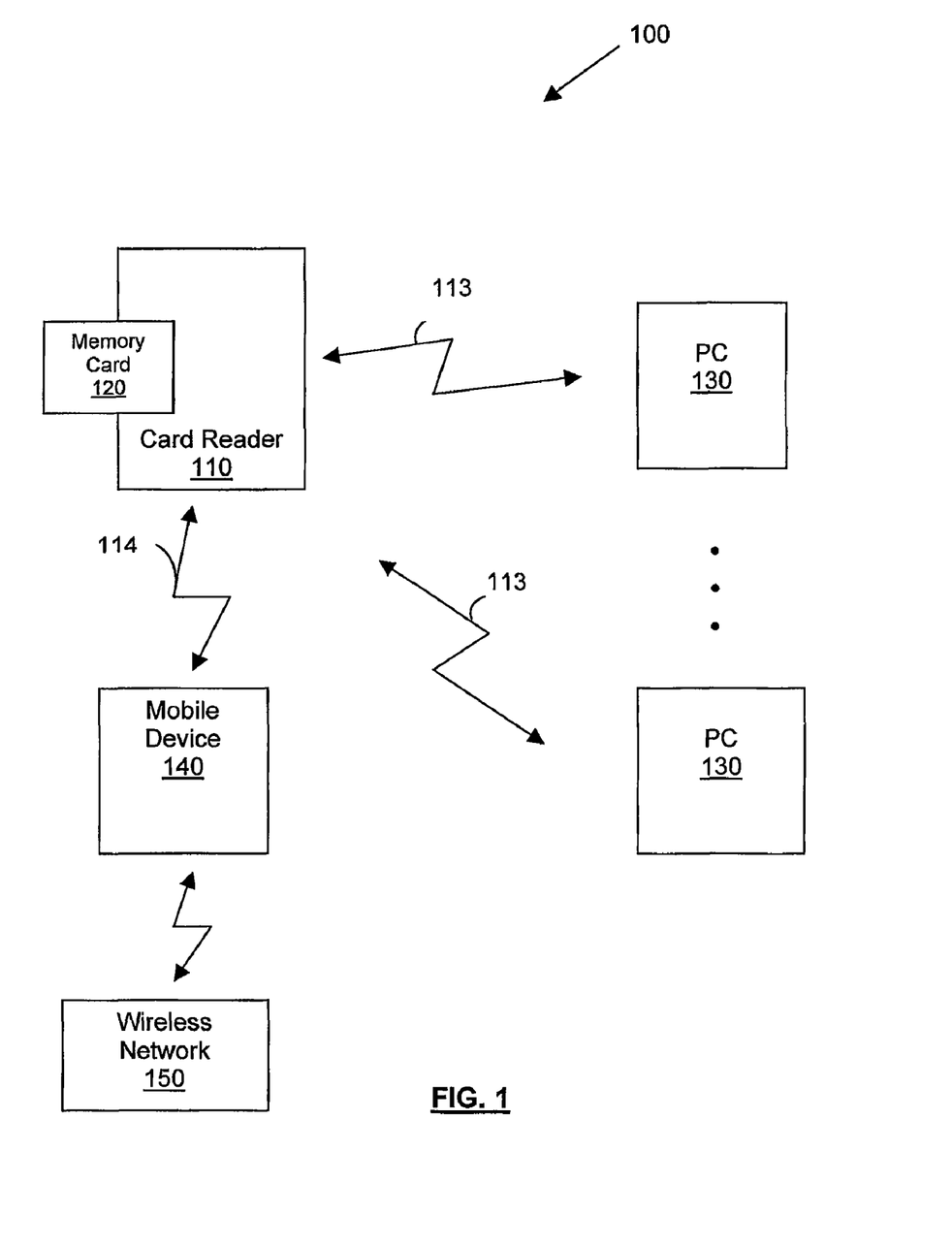
FIG. 1 is a block diagram of a system for accessing a smart card.

FIG. 1 depicts a system 100 for accessing a memory card 120 received by, or otherwise electronically coupled with, a card reader (SCR) 110. System 100 includes multiple computing devices in communication with card reader 110 over a wireless interface. Such computing devices include one or more wireless-enabled personal computers (PC) 130 and at least one wireless-enabled mobile device 140. Each of the computing devices has a wireless transceiver for communicating with card reader 110, which also has a wireless transceiver, over a communication link 113 or 114. In an alternative embodiment, one of the computing devices, such as the mobile device 140, may be in communication with card reader 110 via a wired connection, such as a universal serial bus (USB) cable. In yet another embodiment, either or both of PC 130 and mobile device 140 may be termed an accessing device.

When multiple connections are open between would-be accessing devices (e.g. PC 130 and mobile device 140) and the SCR 110, only one connection can have the smart card session at a given time. Since any session opened by a PC 130 is likely to be a long term session, other connections will not be able to open the session. Using an open channel command, such as the MANAGE_CHANNEL command, the SCR 110 can open a logical channel, if one is available, which can be used to send commands to the memory card 120 for processing, while not affecting the previously opened session.

In order to do this, the SCR 110 manages the use of logical channels in a manner that is transparent to the originator of the commands. This may involve, for example, modifying the Class byte (CLA) of the application protocol data unit (APDU), as defined in the ISO 7816 standard, to specify the correct logical channel. The SCR 110 also ensures that commands that affect other channels, such as a card reset command, are not allowed if received from a connection that uses a logical channel that the SCR 110 is managing.

The SCR 110 also handles receiving further MANAGE_CHANNEL commands on the basic channel or a logical channel that it is managing. This may involve opening a new logical channel either on the basic channel or on the current logical channel, depending on the channel over which the session request was received, and providing the appropriate feedback to the accessing device 130, 140 that sent the MANAGE_CHANNEL command.

In order to manage the processing of simultaneous commands from multiple accessing devices 130, 140, it may be necessary to prioritize commands coming from specific connections, or even commands themselves. This may be required to ensure that more urgent operations, such as user authentication, are not unduly delayed by commands that take longer to process, such as importing a certificate. For example, if a PC 130 is importing certificates from the memory card 120 (which is a relatively long process), and the mobile device 140 needs to authenticate the user in order to unlock the device, the authentication request from the mobile device 140 should be given a higher priority and be processed as soon as a logical channel becomes available.

By default, all commands from the mobile device 140 may be considered higher priority than commands from a PC 130, simply because smart card sessions with mobile device 140 are more likely to be short. Alternatively, commands from the mobile device 140 can be accompanied by an indication of the command type (such as User Authentication or Data Signing, for example) which would allow the SCR 110 to determine which commands should have higher priority, for example based on the number and type of connections open and the number of logical channels available.

The mobile device 140 may be any suitable wirelessly enabled handheld mobile device. The mobile device 140 may be a dual mode (data and voice) communication device and personal digital assistant device, such as is described in further detail below in relation to FIG. 2. Alternatively, the mobile device may be a single mode (data) communication device. The mobile device 140 may be capable of email communication. The user of mobile device 140 may be required to authenticate itself for use of the mobile device 140 by providing a password or a personal identification number (PIN) code, for example to unlock a user interface of mobile device 140, to digitally sign a message or to decrypt an encrypted message.

Personal computers 130 may be any kind of computer, such as a normal desktop computer, laptop or other portable or fixed computer system which may require access to memory card 120. While computing devices 130 are described as being PCs, it should be understood that they need not be of a particular type of computer, nor must they be of the same type or run a particular operating system. While not specifically shown in FIG. 1, each PC 130 is enabled for wireless and/or wired communication with card reader 110 in a manner compatible with the communication capabilities of card reader 110 described below in relation to FIG. 3.

Although FIG. 1 illustrates more than one PC 130 in communication with card reader 110 over a wireless link 113, it is possible to have only one such PC 130 present in system 100. Further, while FIG. 1 does not illustrate a communication link between mobile device 140 and PC 130, such a link may be established.

Memory card 120 may be a smart card. Smart cards are personalized security devices, defined by the ISO 7816-4 standard and its derivatives, as published by the International Organization for Standardization. A smart card may have a form factor of a credit card and may include a semiconductor device. The semiconductor device may include a memory that can be programmed with security information, for example such as a private decryption key, a private signing key, biometrics information or an authentication certificate. The semiconductor device may include a decryption engine, such as a processor and/or dedicated logic circuitry for performing decryption and/or authentication functions. The smart card may include a connector for powering the semiconductor device and performing serial communication with an external device, such as card reader 110.

Smart cards may have exposed contacts on one surface of the card for establishing electrical contact with corresponding contacts on the card reader, thereby facilitating communication between the smart card and the card reader. In one embodiment, memory card 120 and card reader 110 use electrical contact to establish communication therebetween. Although memory card 120 may be physically received in card reader 110, it is not essential that card reader 110 physically receive or contact memory card 120 in order to establish communication therebetween. For example, in an alternative embodiment, memory card 120 may interface with card reader 110 using radio frequency identification (RFID) technology. In such an alternative embodiment, the memory card 120 need only be sufficiently proximate to card reader 110 to enable radio frequency communication therebetween.

Mobile device 140 may be enabled to communicate with a wireless network 150. The wireless network 150 may be implemented as a packet-based cellular network that includes a number of base stations each providing wireless Radio Frequency (RF) coverage to a corresponding area or cell. For example, the wireless network 150 could conform to one or more of the following, among other network standards: Mobitex Radio Network; DataTAC; Global System for Mobile Communication (GSM); General Packet Radio System (GPRS); Time Division Multiple Access (TDMA); Code Division Multiple Access (CDMA); Cellular Digital Packet Data (CDPD); integrated Digital Enhanced Network (iDEN); or various other third generation networks such as Enhanced Data rates for GSM Evolution (EDGE) or Universal Mobile Telecommunications Systems (UMTS).

In some embodiments, instead of, or in addition to, a wireless wide area network, the wireless network 150 may include a wireless local area network, such as, for example, a wireless local area network that conforms to one or more IEEE 802.11 standards, such as 802.11b, 802.11g and 802.11n. In at least some example embodiments, the wireless network 150 is connected, through intermediate communications links (not shown), including, for example, links through the Internet, to one or more enterprise networks (not shown). Typically, such enterprise networks are each associated with a set of respective mobile devices 140, such that the mobile devices 140 are each enabled to exchange electronic messages and other information with the enterprise networks with which the mobile devices 140 are associated.

Figure 2:
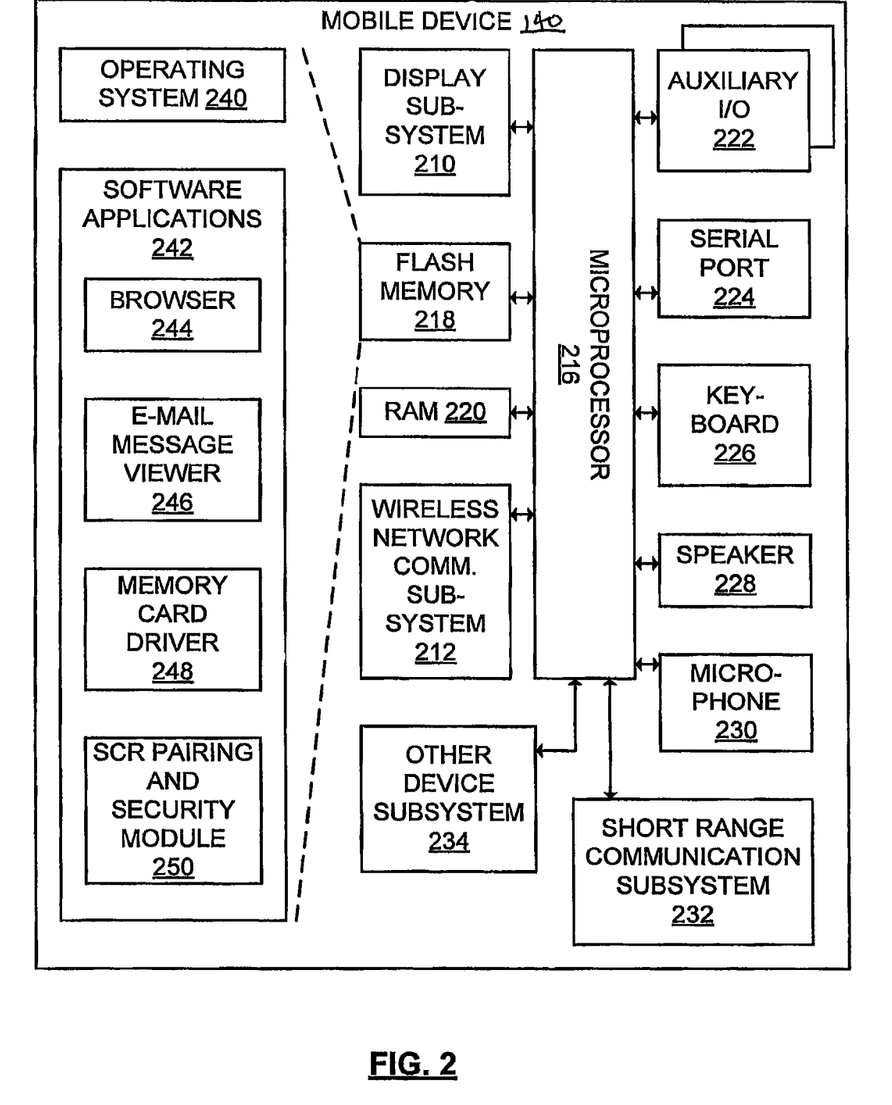
FIG. 2 is a block diagram of a smart card reader for use in the system of FIG. 1.

FIG. 2 illustrates a detailed embodiment of the mobile device 140. The mobile device 140 includes a display subsystem 210 and a wireless network communication subsystem 212 for two-way communications with the wireless network 150 (FIG. 1). According to one embodiment, the communications subsystem 212 includes antennas (not shown), RF transceivers (not shown) and some signal processing capabilities that may be implemented, for example, by a digital signal processor (not shown). The mobile device 140 also includes a controller in the form of at least one mobile device microprocessor 216 that is suitably programmed to control the overall operation and functions of the mobile device 140, which are described in more detail below.

The mobile device 140 includes peripheral devices or subsystems such as a flash memory 218, a random access memory (RAM) 220, an auxiliary input/output (I/O) subsystem 222 (e.g., a scroll wheel), a serial port 224 (e.g., a Universal Serial Bus, or "USB", port), an input device 226 (e.g., a keyboard or keypad), a speaker 228, a microphone 230, a mobile device short-range communications subsystem 232 (e.g., an infrared transceiver, wireless bus protocol system, such as a Bluetooth™ or other means of local wireless communications) and an other device subsystem designated generally by reference 234.

The mobile device microprocessor 216 operates under stored program control with code or firmware being stored in the flash memory 218 (or other type of non-volatile memory device or devices). As depicted in FIG. 2, the flash memory 218 includes stored programs (e.g., firmware) including an operating system program or code module 240 and other programs or software applications indicated generally by reference 242. The software applications 242 can, for example, include a World Wide Web (WWW) browsing application 244 and an e-mail client application 246.

According to example embodiments, the software applications 242 of the mobile device 140 further include a memory card driver 248 that may be used in conjunction with the card reader 110, which is described in more detail below in connection with FIG. 3. Notably, the memory card driver 248 may be provided, not by the manufacturer of the mobile device 140, but, instead, by a third party, i.e., the manufacturer of the memory card 120. Furthermore, an Application Programming Interface (API) may be built in to the memory card driver 248 to allow the mobile device 140 to communicate with the memory card 120 through the card reader 110.

The software applications 242 of the mobile device 140 may further include a smart card reader (SCR) pairing and security module 250 for coordinating a pairing process between the mobile device 140 and the card reader 110. The roles of the memory card driver 248 and the smart card reader pairing and security module 250 will be described in greater detail below. Software applications 242 may further comprise a channel manager (not shown) for managing communication between multiple applications on mobile device 140 that have an active session open with memory card 120 over separate logical channels.

The operating system code 240, code for specific device applications 242, code for the WWW browsing application 244, code for the e-mail client application 246, code for the memory card driver 248, or code for the smart card reader pairing and security module 250 may be temporarily loaded into a volatile storage medium such as the RAM 220 during operation of the mobile device 140. Received communication signals and other data with information may also be stored in the RAM 220. In some embodiments, the mobile device 140 may include, in addition to the internal flash memory 218, persistent memory carried on a SIM (Subscriber Identity Module) card, or other removable device, and at least some of the flash memory 218 may be allocated to the SIM card flash memory.

The stored program control (i.e., the software applications 242) for the mobile device microprocessor 216 also includes a predetermined set of applications, code components or software modules that control basic device operations, for example, data and voice communication applications which are normally installed on the mobile device 140 as the software applications 242 during the manufacturing process. Further applications may also be loaded (i.e., downloaded) onto the mobile device 140 through the operation of networks described above, the auxiliary I/O subsystem 222, the serial port 224 or the mobile device short-range communications subsystem 232. The downloaded code modules or components are then installed by the user (or automatically) in the RAM 220 or the non-volatile program memory (e.g., the flash memory 218).

The serial port 224 comprises a USB-type interface port for interfacing or synchronizing with another device, such as a desktop or notebook computer (not shown). The serial port 224 is used to set preferences through an external device or software application. The serial port 224 is also used to extend the capabilities of the mobile device 140 by providing for information or software downloads, including user interface information, to the mobile device 140 other than through a wireless communication network. In one embodiment, the serial port 224 may be used to communicate with card reader 110.

The mobile device short-range communications subsystem 232 provides an interface for communication between the mobile device 140 and other devices, including the card reader 110, to be described in greater detail in connection with FIG. 3, below. For example, the mobile device short-range communications subsystem 232 may employ an infrared communication link or channel, or may operate according to a wireless bus protocol, such as Bluetooth™, or any other localized wireless means of communication.

Figure 3:
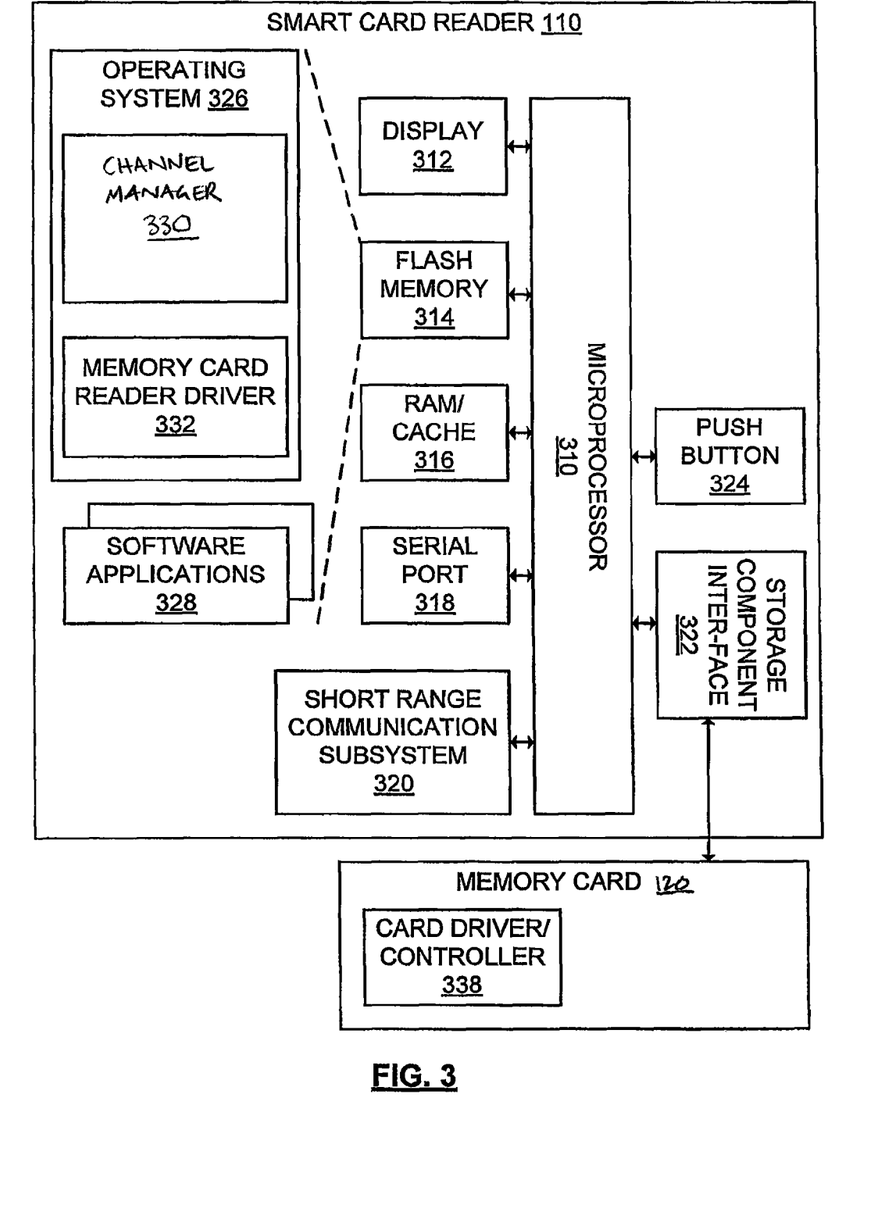
FIG. 3 is a block diagram of mobile device for use in the system of FIG. 1.

FIG. 3 illustrates an example embodiment of the card reader 110, in the exemplary form of a smart card reader. The card reader 110 includes a controller including at least one smart card reader microprocessor 310, which is suitably programmed to control the overall operation and functions of the card reader 110. The card reader 110 also includes an output device 312 (e.g., a display module). The card reader 110 further includes peripheral devices or subsystems such as a flash memory 314, a random access memory (RAM) 316, which, in some embodiments, includes a portion allocated to a data cache, a serial port 318 (e.g., a USB port), a smart card reader short-range communications subsystem 320 (e.g., an infrared transceiver, wireless bus protocol system using a protocol such as a Bluetooth™), a storage component interface 322 (e.g., for a memory card or any other data storage device) and a pairing-activation input device 324 (e.g., a push button).

The smart card reader microprocessor 310 operates under stored program control with code or firmware being stored in the flash memory 314 (or other type of non-volatile memory device or devices). As depicted in FIG. 3, the stored programs (e.g., firmware) include an operating system program or code module 326 and other programs or software applications indicated generally by reference 328. The operating system 326 of the card reader 110 further includes a channel manager component 330 and a memory card reader driver component 332.

The channel manager component 330 is responsible for communicating with the one or more accessing devices 130, 140 and memory card 120 to facilitate establishment and perpetuation (for as long as required) of one or more secure sessions between the one or more accessing devices 130, 140 and memory card 120. The functions of the channel manager component 330 are described in further detail below, with reference to FIGS. 5 and 6.

The memory card reader driver component 332 is responsible for coordinating communications between the card reader 110 and a memory card 120 and/or the memory card driver 248 of the mobile device 140 (via wired or wireless communication link 114).

The operating system code 326, code for specific device applications 328, code for the channel manager component 330, code for the memory card reader driver component 332, or code components thereof, may be temporarily loaded into a volatile storage medium such as the RAM 316. Received communication signals and other data may also be stored in the RAM 316. Additionally, the storage component interface 322 receives the removable memory card 120, providing additional storage space for the card reader 110.

In one embodiment, the memory card 120 has a card driver and controller 338 responsible for coordinating communications between the memory card 120 and the memory card reader driver component 332 of the smart card reader 110. While operation of the card reader 110 is described in a context in which the memory card 120 is a smart card, it will be understood by those skilled in the art that the card reader 110 may be designed to operate with any suitable form of memory device.

The stored program control (i.e., software applications 328) for the smart card reader microprocessor 310 may include a predetermined set of applications, code components or software modules that control basic device operations, for example, management and security related control of the data of the card reader 110, and may be installed on the card reader 110 as a component of the software applications 328 during the manufacturing process. Further applications may also be loaded (i.e., downloaded) onto the card reader 110 through the operation of the serial port 318, the smart card reader short-range communications subsystem 320 or from the memory card 120. The downloaded code module or components are then installed by the user (or automatically) in the RAM 316 or non-volatile program memory (e.g., the flash memory 314).

While the channel manager component 330 and the memory card reader driver component 332 are shown to be an integrated portion of the operating system 326 for security purposes (e.g., individuals must not be permitted to tamper with the channel manager component 330 or the memory card reader driver component 332), the channel manager component 330 and/or the memory card reader driver component 332 could be installed as one of the software applications 328, provided that suitable security related precautions are taken to ensure that the channel manager component 330 and the memory card reader driver component 332 cannot be modified or tampered with by unauthorized users.

The serial port 318 may be a USB-type interface port for interfacing or synchronizing with another device, such as personal computer 130 or the mobile device 140. The serial port 318 is used to set preferences through an external device or software application or exchange data with a device, such as the mobile device 140, which data is stored on the memory card 120 that is plugged into the storage component interface 322 of the card reader 110. The serial port 318 is also used to extend the capabilities of the card reader 110 by providing for downloads, to the card reader 110, of information or software, including user interface information.

The short-range communications subsystem 320 provides an interface for communication between the mobile device 140 or PC 130 and the card reader 110. In one embodiment, the short-range communications subsystem 320 employs an infrared communication link or channel. In another embodiment, the short-range communications subsystem 320 operates according to a wireless RF bus protocol, such as Bluetooth™. However, the short-range communications subsystem 320 may operate according to any suitable local wired or wireless communication protocol, provided that the short-range communications subsystem 232 (FIG. 2) of the mobile device 140 operates using the same protocol, thereby facilitating wireless communication between the mobile device 140 and the card reader 110.

Any communications mechanism and/or protocol may be implemented for the short-range communications subsystems 232, 320, provided that the mobile device 140 and the card reader 110 can communicate with each other when within physical proximity.

Although not shown in FIG. 1 in relation to PC 130, PC 130 comprises a suitable short-range communication subsystem for facilitating wireless communication between PC 130 and card reader 110. The short-range communication subsystem of the PC 130 may operate in a similar manner to the short-range communication subsystem 232 of the mobile device 140, for example using an infrared communication link or a wireless RF bus protocol such as Bluetooth™. Alternatively, the PC 130 may employ a suitable serial interface for communication with card reader 110, for example using a USB cable.

Figure 4:
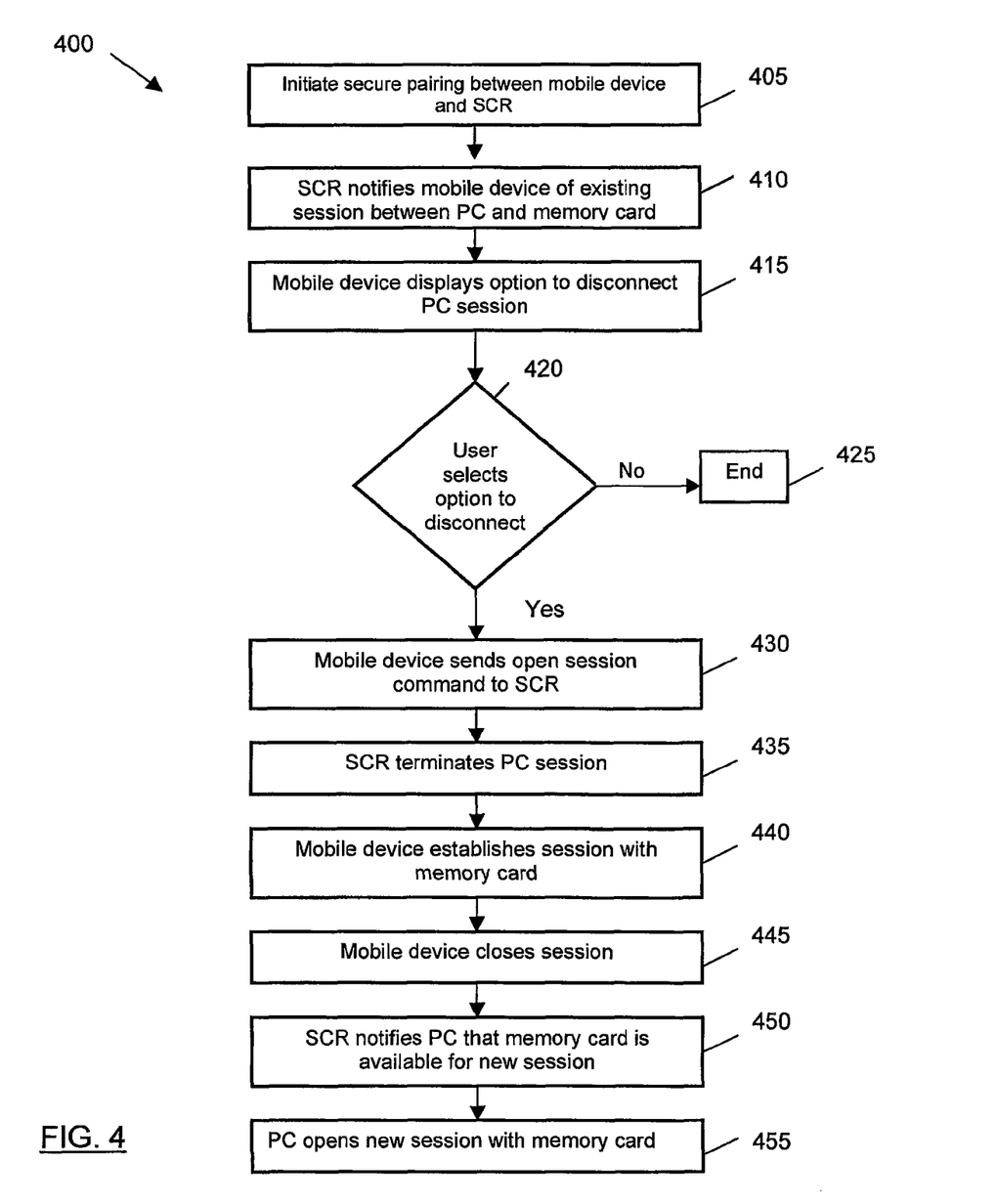
FIG. 4 is a flowchart of a method of managing access to a smart card.

Referring now to FIG. 4, there is shown a flowchart of a first method 400 for managing communication between memory card 120 and a plurality of accessing devices for example, such as PC 130 and mobile device 140. Method 400 assumes that a connection exists between a first accessing device (eg. PC 130) and card reader 110 and that the first accessing device has established a secure session with memory card 120 via card reader 110. Method 400 also assumes that a second accessing device (eg. mobile device 140) is introduced to system 100 subsequent to the first accessing device establishing the secure session with memory card 120.

For purposes of illustration, PC 130 will be used as an example of the first accessing device and mobile device 140 will be used as an example of the second accessing device in the following description. However, it should be understood that the PC 130 or mobile device 140 may be substituted with another form of accessing device. Further, the first accessing device may be a mobile device 140 instead of PC 130 and the second accessing device may be a PC 130 instead of mobile device 140.

At step 405, mobile device 140 and card reader 110 initiate securing pairing therebetween. Secure pairing of the mobile device 140 and card reader 110 involves setting up encryption and decryption keys for use in communicating with each other and then forming the connection for secure communication. The secure pairing of mobile device 140 and card reader 110 may be performed such that they each generate a cryptographic key for encrypting communications between mobile device 140 and card reader 110. The cryptographic key may be formed from separately generated symmetric keys K1, K2 and a hash result created by hashing packets communicated over communication link 114. Once the cryptographic key is generated, the mobile device 140 and card reader 110 become securely paired and the cryptographic key can be used for encrypted communication therebetween.

At step 410, the card reader 110 notifies mobile device 140 of the existing session between PC 130 and memory card 120. This notification may be passive or active. If the notification is active, the card reader may proactively indicate to the mobile device that memory card 120 is already engaged in a session or if the notification is passive, the card reader 110 may respond to a power-up command from the mobile device 140 to memory card 120 by indicating that a session has already been established.

Steps 405 and 410 may be omitted where mobile device 140 is not newly introduced to system 100 and already has information that memory card 120 is engaged in a session with another device.

At step 415, once mobile device 140 determines that there is a functional requirement to open a session with memory card 120, mobile device 140 displays an option, for example via a dialog box displayed to the user by display subsystem 210. The option thus displayed to the user is to disconnect the device currently having the open session with memory card 120 (which in this case is the PC 130) and therefore terminate the open session. An option to "cancel" and not terminate the open session may also be displayed.

At step 420, the user selects one of the options displayed at step 415, for example by providing input to keyboard 226 or to auxiliary I/O 222 (eg. using a scroll wheel or a track ball). If the user selects the "cancel" option, method 400 ends at step 425. If the user selects the option to disconnect the existing session with PC 130, mobile device 140 transmits an open session command to card reader 110 over link 114, at step 430.

At step 435, the card reader 110 receives the open session command from mobile device 140 and is configured to recognize that the command requires the existing session to be closed in order for the mobile device 140 to open another session with memory card 120. Accordingly, the card reader 110 effectively terminates the session between PC 130 and memory card 120. This termination may be performed by notifying the PC 130 that memory card 120 can no longer be accessed by card reader 110. This may happen when, for example, memory card 120 is removed from card reader 110 or the connection between memory card 120 and card reader 110 is otherwise broken or interrupted. Upon receipt of such a notification from card reader 110, PC 130 treats the session as having been ended.

Termination of a session between PC 130 and memory card 120 may be made immediately, so as to interrupt any data exchange, or may be made subsequent to completion of a data transfer or other operation.

At step 440, mobile device 140 establishes a session with memory card 120 via card reader 110. Mobile device 140 may wait for confirmation from card reader 110 that the previous session was terminated or it may not wait for such confirmation and simply assume that termination has occurred.

At step 445, mobile device 140 transmits a close session command to card reader 110, once mobile device 140 has completed the operation for which it required the session with memory card 120 to be opened. Card reader 110 then terminates the session between memory card 120 and mobile device 140.

At step 450, card reader 110 may notify PC 130 that memory card 120 is again available for opening a new session. As it is common for a PC to maintain an open session with memory card 120 as long as communication between card reader 110 and PC 130 is established, the PC 130 will usually open a new session with memory card 120, at step 455.

As mobile device 140 is recognized by card reader 110 as being a device requiring relatively short sessions with memory card 120, in contrast with the long sessions opened by PC 130, card reader 110 may be programmed to recognize the open session command from mobile device 140 as being a command taking priority over the existing session between the memory card 120 and the PC 130. In a further exemplary embodiment, one or more other computing devices may be recognized as having a relatively higher priority for creating a session with memory card 120, so that a relatively lower priority device can have a session open, subject to the needs of the higher priority devices.

Method 400 described in relation to FIG. 4 comprises one example of a method for managing access to a smart card by multiple accessing devices. Method 400 represents what is, in effect, a brute force method, in which the pre-existing session between PC 130 and memory card 120 is terminated in order to allow a shorter, higher priority session to be established between the mobile device 140 and smart card 120. In contrast, an alternative method of managing access to memory card 120 is described below, in relation to FIG. 5. This alternative method involves the creation of additional logical channels (on top of the basic channel) over which the newly introduced accessing device (e.g. mobile device 140) can communicate with memory card 120. The creation of such an additional logical channel is facilitated by channel manager component 330 on card reader 110.

Figure 5:
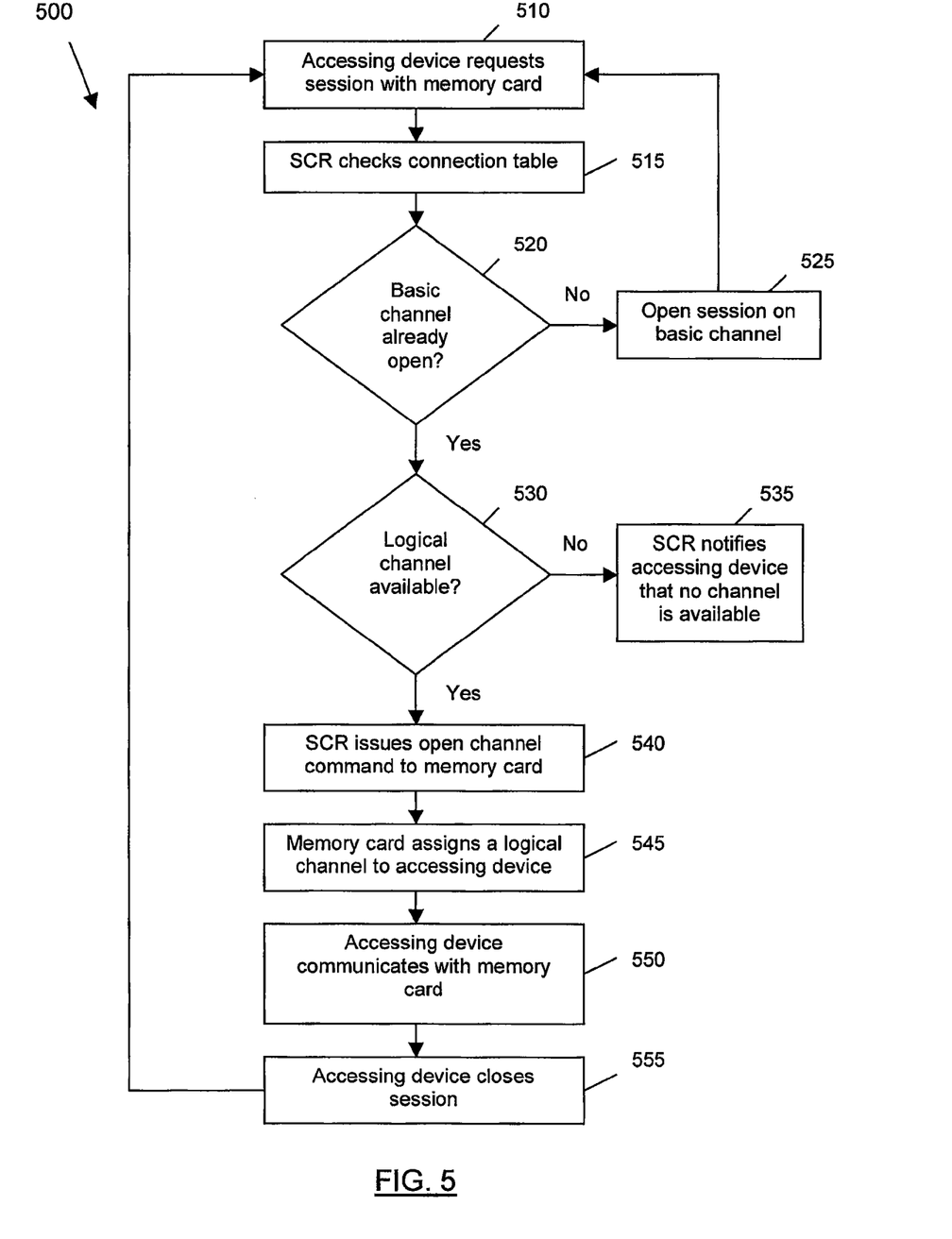
FIG. 5 is a flowchart of a further method of managing access to a smart card.

The channel manager component 330 maintains a connection table in flash memory 314 or RAM/cache 316, with entries in the table for each connection (which may be a securely paired connection) established between the memory card 120 and a respective accessing device 130, 140. The connection table may also comprise entries for securely paired connections between card reader 110 and accessing device 130, 140 where no session is currently established with memory card 120 for that accessing device 130, 140.

For each connection entry in the connection table, there may be one or more channel entries. For example, where PC 130 has a session established with memory card 120 by the CSP over the basic channel, the connection table will have a connection entry for PC 130 and a channel entry for the basic channel associated with that session. If PC 130 opens a logical channel with memory card 120, for example where a further application on PC 130 needs to access memory card 120, then a further channel entry will be created in the connection table associated with the connection for PC 130. Additionally, the number of the logical channel is recorded in the connection table. In this example, the basic channel is number 0 and the new logical channel may be channel 1.

Building on the above example, suppose mobile device 140 establishes a securely paired connection with card reader 110 and attempts to establish a session with memory card 120. In this case, the channel manager component 330 will issue a MANAGE_CHANNEL command to memory card 120, which will then create a new logical channel over which mobile device 140 can securely communicate with memory card 120. The newly established connection between mobile device 140 and card reader 110 is recorded in the connection table, together with the logical channel assigned to the session between mobile device 140 and memory card 120.

As the establishment of the logical channel is transparent to mobile device 140 (because card reader 110 does not make mobile device 140 aware of the pre-existing session that PC 130 has established with memory card 120 over the basic channel), mobile device 140 attempts to communicate with memory card 120 over the basic channel. Thus, the APDUs transmitted from mobile device 140 to memory card 120 (via card reader 110) are modified by channel manager component 330 so as to appear to have been transmitted on the assigned logical channel for the session with mobile device 140. This may be done by modifying the class byte of each APDU from mobile device 140 so as to change the channel identifier in that byte, for example from 0 (the basic channel) to 2 (the assigned logical channel). The connection table is used by channel manager component 330 to ensure appropriate modification of the class bytes so that they appear to have been received over the assigned logical channel.

If another application on mobile device 140 then seeks to communicate with memory card 120, the channel manager on mobile device 140 may then send a further session request to card reader 110. Card reader 110 then transmits a further MANAGE_CHANNEL command to memory card 120 to open a further logical channel. Memory card 120, in this example, will assign the fourth (and last available) channel, which is channel number 3, to the new session with the further application on mobile device 140. Memory card 120 notifies card reader 110 that channel 3 has been assigned for the new session established with mobile device 140, and card reader 110 in turn notifies mobile device 140 of this assignment.

The assignment of the new logical channel for the application on mobile device 140 is not transparent to mobile device 140 because the channel manager of mobile device 140 is already aware of the session established over channel 2, which it assumes is the basic channel (channel 0). Thus, the channel manager of mobile device 140 is expecting to receive a logical channel assignment for the second session that it has sought to establish with memory card 120.

Under the above-described scenario, the connection table would have two connection entries, one for PC 130 and one for mobile device 140. The connection entry for PC 130 would indicate that channels 0 and 1 are assigned to the connection with PC 130, while the connection entry for mobile device 140 would indicate that channels 2 and 3 are assigned to mobile device 140. Channel manager component 330 also includes a mapping reference for each assigned channel in order to indicate how the incoming APDUs need to be modified. For example, when mobile device 140 transmits APDUs over what it assumes is the basic channel, a mapping of channel 0 to channel 2 is performed by channel manager component 330 in card reader 110 according to the relevant channel entry in the connection table. Table 1 below is an example connection table, depicting the recorded connection and channel entries (plus mapping, if relevant) for the above-described example.

TABLE 1

| Connection | Channel |
|---|---|
| PC 130 | 0 |
|  | 1 |
| Mobile Device 140 | 2 (map 0 to 2) |
|  | 3 |

Referring now to FIG. 5, a method 500 of managing access to memory card 120 is described in further detail. Method 500 begins at step 510, at which an accessing device, for example either PC 130 or mobile device 140, requests a session with memory card 120. This session request may be in the form of a cold reset or a warm reset, depending on whether memory card 120 is in a powered-down or powered-up state, respectively.

The channel manager component 330 of SCR 110 receives the session request and, at step 515, checks the connection table stored in flash memory 314 or RAM/cache 316 to determine which channels, if any, are available to establish a session with memory card 120. If, at step 520, channel manager component 330 determines that the basic channel is not in use, then at step 525, channel manager component 330 causes memory card 120 to open a session with accessing device 130 or 140 on the basic channel and updates the connection table accordingly.

If, at step 520, channel manager component 330 determines that the basic channel is already in use, then at step 530, channel manager component 330 determines from the connection table whether a logical channel is available for the requested session. If no logical channel is available, for example because the maximum number of possible logical channels are already in use, SCR 110 notifies the accessing device 130 or 140 at step 535 that no channel is available.

If, at step 530, it is determined that a logical channel is available for the requested session, SCR 110 issues an open channel command, such as a MANAGE_CHANNEL command, to memory card 120, at step 540. Memory card 120 then assigns a logical channel to the accessing device 130 or 140 requesting the new session, at step 545. If the session request was made over a pre-existing logical channel, the assigned logical channel is communicated to SCR 110 from memory card 120, and then in turn to accessing device 130 or 140. Otherwise, the assigned channel number is not communicated to the accessing device 130 or 140 as the accessing device 130 or 140 assumes that it is communicating with the memory card 120 over the basic channel.

At step 550, the accessing device 130 or 140 proceeds to communicate with memory card 120 in order to achieve its desired purpose. Such communication will usually include transmission of one or more APDUs according to the ISO 7816-4 standard.

If the channel assigned to the session requested by the accessing device 130 or 140 is different to the channel that the accessing device 130 or 140 assumes it has been assigned, then mapping of the assumed channel to the assigned channel is required. This is described in further detail below, with reference to FIG. 6.

Once accessing device 130 or 140 has communicated with memory card 120 to achieve its desired purpose, then at step 555, the accessing device 130 or 140 may close the session with memory card 120. This may be done by issuing an appropriate command to SCR 110, which in turn issues an appropriate end session command to memory card 120, indicating the channel on which the session was opened. Memory card 120 then closes the session for that channel and channel manager component 330 updates the connection table to remove the channel entry corresponding to the closed channel from the relevant connection entry. This close function explicitly closes a logical channel other than the basic channel. The closed logical channel is then available for reuse.

If the channel sought to be closed is the basic channel, this may necessitate closing of the logical channels also. In this case, the channel manager component 330 may facilitate re-establishment of the sessions that were open on the logical channels and that were forced to close. For example, one of the previously open sessions on a logical channel may be re-opened on the basic channel and the other sessions may be re-opened on newly re-established logical channels, based on the connections and channels recorded in the connection table.

Method 500 may be performed repeatedly over time, according to the access needs of the various accessing devices that establish connections with SCR 110. Such repeated performance need not necessarily include step 555 unless memory card 120 has reached its maximum number of logical channel assignments.

Figure 6:
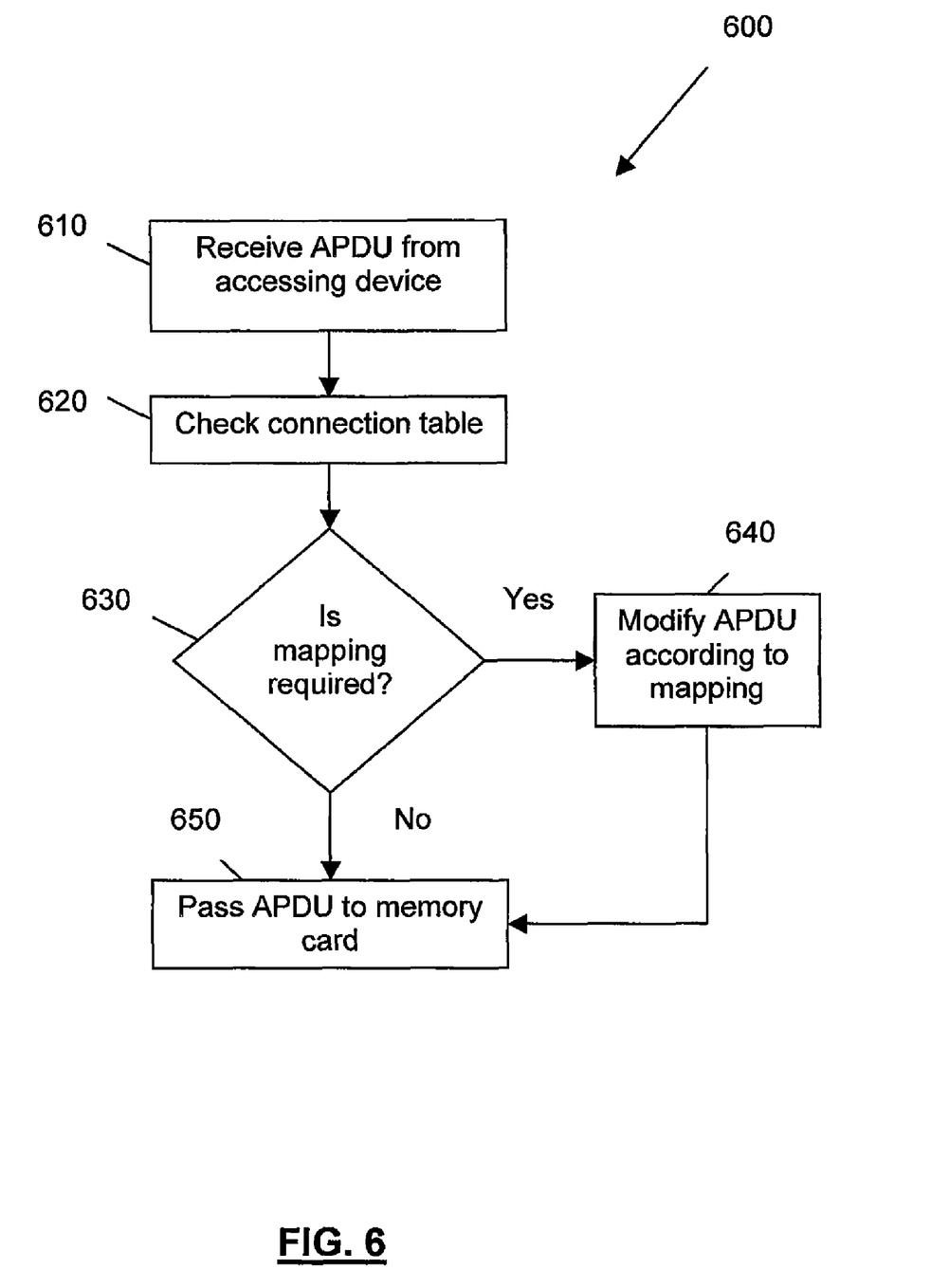
FIG. 6 is a flowchart of a method of mapping an assumed channel to an assigned channel.

Referring now to FIG. 6, a method 600 of mapping an assumed channel to an assigned channel is described in further detail. Method 600 assumes that a session between an accessing device 130 or 140 and memory card 120 has been established.

Method 600 begins at step 610, at which SCR 110 receives an APDU from accessing device 130 or 140. Channel manager component 330 determines the connection over which the APDU was received and the channel over which the APDU was intended by accessing device 130 or 140 to be provided to memory card 120. The channel manager component 330 determines the intended channel number by inspecting the relevant bits in the class byte of the APDU. The channel manager component 330 then checks the connection table at step 620 and compares the intended channel with the assigned channel.

The channel manager component 330 determines whether any mapping of the channel number is required, at step 630. If the intended channel is the same as the assigned channel, then the intended channel is correct and no mapping is required. If the intended channel is different from the assigned channel, then it is an assumed channel and must be mapped to the assigned channel according to a mapping previously determined by the channel manager component 330 and recorded in the connection table If the channel of the APDU is required to be mapped from an assumed channel to an assigned channel, then at step 640 the channel manager component 330 modifies the relevant bits in the class byte of the APDU according to the mapping specified in the connection table.

At step 650, if no channel mapping is required or if the APDU has been modified according to the required mapping, the APDU is then passed to memory card 120 for processing. For responses from the memory card 120 that are sent back to the accessing device 130 or 140, an inverse mapping process may be employed, as necessary.

It should be understood that variations and modifications can be made to the embodiments described and illustrated herein without departing from the spirit of the described embodiments, the general scope of which is defined in the appended claims.

The invention claimed is:

1. A smart card reader (SCR) for managing concurrent access to a smart card by a plurality of accessing devices, the SCR comprising:
   a processor configured to provide a channel manager for interfacing with the smart card; and
   a communication subsystem responsive to the channel manager for communicating with the plurality of accessing devices,
   wherein, when the channel manager receives a close session request from a first accessing device, and a first session is open on a first channel between the first accessing device and the smart card and a second session is open on a second channel between a second accessing device and the smart card, the channel manager is configured to:
   issue a close channel command to the smart card to close the second channel;
   issue the close session request from the first accessing device to the smart card to close the first session and the first channel; and
   issue a further session request to the smart card to re-open the first channel, and continue the second session on the re-opened first channel.

2. The smart card reader of claim 1, wherein the first channel is a basic channel and the second channel is a logical channel.

3. The smart card reader of claim 1, wherein, while the first session is open, the channel manager is configured to: receive data units from the second accessing device intended for transmission to the smart card on the first channel; and modify the data units to indicate that the data units are intended for transmission to the smart card over the second channel.

4. The smart card reader of claim 3, wherein the channel manager modifies the data units by identifying a channel identifier within the data units received from the second accessing device, and modifying the channel identifier within the data units to identify the second channel.

5. The smart card reader of claim 1, wherein after the second session is continued on the re-opened first channel, the second channel is marked as available for reuse.

6. The smart card reader of claim 1, further comprising a memory, the memory storing a connection table, wherein the connection table includes entries for each session established between the smart card and a respective accessing device.

7. The smart card reader of claim 6, wherein the connection table includes, for each session entry, one or more channel entries.

8. The smart card reader of claim 1, wherein the channel manager controls the channels that can be opened between the smart card and the plurality of accessing devices so that the total number of channels is limited to a predetermined number.

9. The smart card reader of claim 1, further comprising a socket for receiving the smart card and electrically coupling the processor and the smart card.

10. The smart card reader of claim 1, wherein the communication subsystem comprises a wireless communication subsystem.

11. A method of managing concurrent access to a smart card by a plurality of accessing devices, the method comprising:
   receiving a close session request from a first accessing device when a first session is open on a first channel between the first accessing device and the smart card and a second session is open on a second channel between a second accessing device and the smart card;

issuing a close channel command to the smart card to close the second channel;

issuing the close session request from the first accessing device to the smart card to close the first session and the first channel; and issuing a further session request to the smart card to re-open the first channel, and continue the second session on the re-opened first channel.

12. The method of claim 11, wherein the first channel is a basic channel and the second channel is a logical channel.

13. The method of claim 11, further comprising, while the first session is open, receiving data units from the second accessing device intended for transmission to the smart card on the first channel and modifying the data units to indicate that the data units are intended for transmission to the smart card over the second channel.

14. The method of claim 13, wherein the modifying comprises identifying a channel identifier within the data units received from the second accessing device and modifying the channel identifier within the data units to identify the second channel.

15. The method of claim 11, wherein after the second session is continued on the re-opened first channel, the second channel is marked as available for reuse.

16. The method of claim 11, further comprising storing a connection table in a memory of the smart card reader, the connection table comprising entries for each session established between the smart card and a respective accessing device.

17. The method of claim 16, wherein the connection table includes, for each session entry, one or more channel entries.

18. The method of claim 11, further comprising controlling the channels that can be opened between the smart card and the plurality of accessing devices so that the total number of channels is limited to a predetermined number.

19. The method of claim 11, wherein the session request is received by wireless communication between the smart card reader and the second accessing device.

20. A non-transitory computer readable storage medium storing program instructions which, when executed by a processor on a smart card reader, cause the processor to perform a method of managing concurrent access to a smart card by a plurality of accessing devices, the method comprising:

when a first session is open on a first channel between a first accessing device and the smart card and a second session is open on a second channel between the second accessing device and the smart card, receiving a close session request from the first accessing device;

issuing a close channel command to the smart card to close the second channel;

issuing the close session request from the first accessing device to the smart card to close the first session and the first channel; and issuing a further session request to the smart card to re-open the first channel, and continue the second session on the re-opened first channel.

* * * * *